US00RE40655E

(19) United States
(12) Reissued Patent
Arakawa et al.

(10) Patent Number: US RE40,655 E
(45) Date of Reissued Patent: Mar. 10, 2009

(54) POLARIZATION LIGHT SPLITTING FILM, BACKLIGHT SYSTEM AND LIQUID CRYSTAL DISPLAY HAVING PARTICULAR DIFFUSION LAYER UNDER OPTICAL ROTATIONAL SELECTION LAYER

(75) Inventors: Fumihiro Arakawa, Tokyo (JP); Keiji Kashima, Tokyo (JP)

(73) Assignee: Dai Nippon Printing Co., Ltd., Shinjuku-Ku (JP)

(21) Appl. No.: 11/303,093

(22) Filed: Dec. 16, 2005

Related U.S. Patent Documents

Reissue of:
(64) Patent No.: 6,559,911
Issued: May 6, 2003
Appl. No.: 09/024,983
Filed: Feb. 17, 1998

(30) Foreign Application Priority Data

Feb. 18, 1997 (JP) ..... 9-048562

(51) Int. Cl.
*G02F 1/1335* (2006.01)

(52) U.S. Cl. ..... 349/96; 349/9; 349/98
(58) Field of Classification Search ..... 349/96, 349/9, 98, 137, 175, 115
See application file for complete search history.

(56) References Cited

U.S. PATENT DOCUMENTS

| | | | | | |
|---|---|---|---|---|---|
| 3,712,707 | A | | 1/1973 | Henkes, Jr. | |
| 5,004,785 | A | * | 4/1991 | Ida et al. | 525/305 |
| 5,295,009 | A | | 3/1994 | Barnik et al. | |
| 5,325,218 | A | * | 6/1994 | Willett et al. | 349/74 |
| 5,418,631 | A | * | 5/1995 | Tedesco | 359/15 |
| 5,592,332 | A | * | 1/1997 | Nishio et al. | 359/619 |
| 5,712,694 | A | * | 1/1998 | Taira et al. | 349/9 |
| 5,721,603 | A | * | 2/1998 | De Vaan et al. | 349/194 |
| 5,808,709 | A | | 9/1998 | Davis et al. | |
| 5,828,471 | A | | 10/1998 | Davis et al. | |
| 5,900,973 | A | | 5/1999 | Marcellin-Dibon et al. | |
| 5,917,565 | A | | 6/1999 | Suzuki | |
| 5,940,149 | A | | 8/1999 | Vanderwerf | |
| 5,973,833 | A | | 10/1999 | Booth et al. | |
| 6,038,054 | A | | 3/2000 | Sakai et al. | |
| 6,559,911 | B2 | | 5/2003 | Arakawa et al. | |
| RE39,605 | E | * | 5/2007 | Verrall et al. | 428/1.3 |
| 2003/0164906 | A1 | | 9/2003 | Arakawa et al. | |

FOREIGN PATENT DOCUMENTS

| | | |
|---|---|---|
| EP | 0 606 939 | 1/1994 |
| EP | 0 606 940 | 1/1994 |
| JP | 57-100411 | 6/1982 |
| JP | 04-184429 | 7/1992 |
| JP | 05-169015 | 7/1993 |
| JP | 06-265892 | 9/1994 |
| JP | 06-289226 | 10/1994 |
| JP | 07-49496 | 2/1995 |
| JP | 07-036032 | 2/1995 |
| JP | 07-261122 | 10/1995 |
| WO | WO 96/02016 | 1/1996 |

OTHER PUBLICATIONS

"Handbook of Optics", Walter G. Driscoll, et al:, Optical Society of America, 1978, McGraw–Hill Book Company, New York 141880.

* cited by examiner

*Primary Examiner*—Mike Qi
(74) *Attorney, Agent, or Firm*—Burr & Brown

(57) ABSTRACT

A polarization light splitting film having a light receiving side and a light transmitting side. The polarization light splitting film includes an optical rotation selection layer at the light receiving side for reflecting one of right and left circularly polarized components of a light beam that is incident on the light receiving side and for transmitting the other one of the right and left circular polarization components of the light beam, and a quarter-wave layer laminated over the optical rotation selection layer at the light transmitting side.

1 Claim, 6 Drawing Sheets

POLARIZATION LIGHT SPLITTING FILM, BACKLIGHT SYSTEM AND LIQUID CRYSTAL DISPLAY HAVING PARTICULAR DIFFUSION LAYER UNDER OPTICAL ROTATIONAL SELECTION LAYER

Matter enclosed in heavy brackets [ ] appears in the original patent but forms no part of this reissue specification; matter printed in italics indicates the additions made by reissue.

*More than one reissue application has been filed for the reissue of U.S. Pat. No. 6,559,911. The reissue applications are: the present application, which is a reissue application of U.S. Pat. Nos. 6,559,911, and 12/273,097, which is a continuation of the present application.*

This application claims the benefit of Japanese Application No. 09-48562, filed on Feb. 18, 1997, which is hereby incorporated by reference.

BACKGROUND OF THE INVENTION

1. Field of the Invention

The present invention relates to a light splitter and, more particularly, to a polarization light splitting film for use in a liquid crystal display device and the like.

2. Discussion of the Related Art

Due to recent technological development, liquid crystal displays (LCDs) are becoming increasingly popular for use in the display component of a personal computer and the like. Advantages of the liquid crystal display, such as the fact that they are thinner and lighter than the conventional display devices, for example, largely contributed to their gain in popularity. Moreover, a narrow viewing angle in conventional LCDs, which was previously considered to be a disadvantage, has been recently overcome by newly developed LCDs with a wide viewing angle. Accordingly, a wide variety of usages of the LCDs beyond personal-computer-use is expected to emerge.

Since a liquid crystal panel itself is not a light-emission device, the LCD needs an illumination light source. Reflection type LCDs use external illumination as the illumination light source. However, transmission type LCDs equipped with an internal backlight system are more popular.

FIG. 13 shows a typical structure of a conventional transmission type LCD. In this example, a backlight system 20 includes a light source 21, light guide 22, light diffusion elements 23, reflective sheet 24, diffusion sheet 25, and a prism sheet 26. Light emitted from light source 21 is incident on light guide 22. A cone-like shaped object indicates a viewing position of the LCD. The incident light propagates in the light guide 22 by experiencing multiple total internal reflections. A portion of the light in the light guide 22 is diffused (or scattered) upwards by light diffusion elements 23 and emerges from the light guide 22. A portion of the light emitted downwards from the light guide 22 is reflected by reflection sheet 24 and is returned to the light guide 22. The light emitted upwards from the light guide 22 is diffused by diffusion sheet 25 and converged by prism sheet 26. The resultant light is used as illumination light for a liquid crystal cell 30, which is sandwiched by polarizing plates 31 and 32.

In most LCDs, polarized light that is obtained by transmitting light through a polarizing plate is modulated in the liquid crystal layer. Approximately half of the incident light is absorbed at the polarizing plate and, accordingly, the efficiency in the light usage is low. In order to produce sufficient luminance, more light needs to be incident on the polarizing plate. However, increasing the light intensity causes a variety of problems, such as increased power consumption of the light source and adverse effects on the liquid crystal material due to heat generated from the thus powered up light source, which degrades the display quality.

To solve the above-mentioned problems, the following technique has been proposed. First, unpolarized light from a light source is split by a polarization light splitter into two linearly polarized light beams having the polarization directions orthogonal to each other. Then, one of the linearly polarized light beams is directly used for illumination while the other polarized light beam is used indirectly. In other words, one of the polarization components, which are separated by the polarizing plate, is directly incident on the liquid crystal cell, whereas the other polarization component, which progresses towards the light source, is re-directed toward the polarizing plate by reflection or the like. This way, the efficiency in light usage can be improved. Some of the recent developments along this direction are as follows.

(1) In Japanese Application Laid-Open Publication No. 04-184429, an unpolarized light beam from a light source is split by a polarization light splitter into two orthogonally polarized light beams. One of the polarized light beams is directed towards the liquid crystal cell. The other beam, which progresses towards the light source, is converged and then reflected towards the liquid crystal cell.

(2) A backlight system disclosed in Japanese Application Laid-Open Publication No. 06-265892 includes a beam deflector that transmits light in a direction substantially normal to the light emitting surface of a planar light guide. The deflector is disposed on the light emitting side of the planar light guide, and a polarization light splitter is disposed above the deflector.

(3) In a backlight system disclosed in Japanese Application Laid-Open Publication No. 07-261122, a polarized light splitter is located on the light emitting side of a parallel light generating device. The parallel light generating device is constructed of a light scattering conductor including a portion having a wedge-shaped profile.

(4) Similar systems are proposed in Japanese Application Laid-Open Publication No. 06-289226, No. 07-49496. All the proposed polarized light splitting systems, including the above-mentioned (1) to (3), employ a multi-layer film utilizing the Brewster law (Brewster's angle) as polarization splitting means.

FIGS. 11 and 12 show cross-sectional views of conventional polarization light splitting films. In FIG. 11, polarization light splitting film 40 has a multi-layer structure formed by alternately laminating light transmission layers 41 having a large refractive index and light transmission layers 42 having a small refractive index. Using Brewster's law, the polarization light splitting film 40 is designed to transmit the p-polarized light component and reflect the s-polarized light component.

Polarization light splitting film 40 in FIG. 12 also has a laminated structure of two types of layers 43, 44 having different refractive indices. The thickness of the layers 43 is designed to cause interference with respect to visible light. In this construction, if the refractive indices of the layers 43, 44 and the thickness of layer 43 satisfy a certain predetermined relationship, the transmission contrast between the p-polarized component and the s-polarized component becomes large with respect to a certain incident angle. The polarization light splitting film 40 of FIG. 12 utilizes this property to transmit polarized light.

However, the above-mentioned conventional techniques have the following disadvantages. The backlight system of (1) is intended for use with projection LCD devices. The structure of such an illumination system requires a large amount of space. Therefore, it cannot be applied to thin panel-type LCD devices.

The backlight system of (2) is applicable to thin LCD devices. If a polarized light splitting layer is fabricated on the inclined sides of a columnar prism array having a plurality of triangular-shape prism units, a relatively high efficiency can be achieved in light usage. However, the structure of the polarized light splitting layer becomes complicated. In particular, it is difficult to fabricate the polarized light splitter layer on the inclined sides of the columnar prism array. This type of backlight system is therefore not suitable for mass production.

As for the backlight system of (3), if the parallel light generating device is constructed of a certain light scattering conductor having a wedge-shaped profile, superior efficiency in light usage can be obtained. However, it is difficult to manufacture such a light scattering conductor with a desirable light scattering performance. Accordingly, this system is not suitable for actual use.

In addition, since all the systems discussed in (1) to (4) utilize the Brewster law (or Brewster's angle), it is necessary to form multiple layers on an inclined face. Therefore, these systems require a complicated structure and are not suitable for mass production.

Furthermore, to produce a sufficient polarization light splitting property using the conventional multi-layer structures above, at least five layers need to be laminated, resulting in a complicated layer structure. In addition, the polarization light splitting property depends on the incident angle and the wavelength, etc., imposing many undesirable limitations in the actual use. For example, because illumination light that propagates in a direction normal to the emitting surface of the backlight system is polarized and split using Brewster's law, the multiple layers need to be inclined with respect to the emitting surface by forming the layers on an inclined plane. Therefore, the polarization light splitting device must be thick enough to accommodate this structure. This is not consistent with a recent trend towards reducing the thickness of LCD devices.

In addition, the conventional polarization light splitting devices would not be effective unless the coupling of the light splitting device with other elements of the backlight system, such as a diffusion film and a prism sheet, is optimized. Also, it is important to add anti-reflection layers, hard coating layers, adhesive compound/cement layers, and/or polarizing layers to the polarized light splitting device for the whole device to be effective under various operating conditions. However, there have been no such proposals.

As described above, some of the conventional backlight systems use a laminated structure of a plurality of layers having different refractive indices. Other systems use the multi-layered structure formed on a prism-like shaped object. In any event, the conventional backlight systems are limited in the sense that they use the Brewster law (Brewster's law).

SUMMARY OF THE INVENTION

Accordingly, the present invention is directed to a polarization light splitting film that substantially obviates the problems due to limitations and disadvantages of the related art.

An object of the present invention is to provide a thin, highly efficient polarization light splitting film having a relatively simple structure and being suitable for mass production.

Another object of the present invention is to provide a polarization light splitting film for use in a backlight system that does not require a complicated coupling with other elements of the backlight system.

A further object of the present invention is to provide a thin-type backlight and an LCD device that utilizes a polarization light splitting film of the present invention.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the polarization light splitting film according to an aspect of the present invention includes an optical rotation selection layer that reflects one of the right and left circular polarization components of incident light and transmits the other component of the light. The polarization light splitting film also includes a quarter-wave plate. These two layers together perform a similar function to that of the conventional polarization light splitting film that transmits linearly polarized light. The reflected light of the polarization light splitting film of the present invention is a circularly polarized beam. When the optical rotation face of the polarization light splitting film is used for a light receiving surface and the quarter-wave plate side face is used for a light transmitting surface, either the right or left circular polarization component of the incident light is reflected and the other component is transmitted at the optical rotation selection layer. The transmitted light is converted into linearly polarized light at the quarter-wave plate, and is emitted from the polarization light splitting film as linearly polarized light. A cholesteric liquid crystal layer may be used for the optical rotation selection layer. According to the present invention, the efficiency in light usage of the backlight system utilizing the polarization light splitting film of the present invention can be improved.

A diffusion layer, prism layer, and/or lens layer may additionally be formed on the light receiving side of the polarization light splitting film of the present invention. In this case, the polarization light splitting film possesses the corresponding functions of diffusion, deflection, and/or convergence.

Also, by adding an anti-reflection layer on the incident surface, undesirable reflection at the incident surface can be prevented. Furthermore, a polarizer layer may be laminated on the emitting surface of the polarization light splitting film to generate linearly polarized light with a higher linearity.

A backlight system according to another aspect of the present invention includes the above-described polarization light splitting film, a plate-like light guide placed on the incident surface side of the polarization light splitting film, and a light source placed on the side of the light guide.

An LCD device according to a further aspect of the present invention includes the above-described backlight as a back light source of a liquid crystal cell.

In another aspect, the present invention provides a polarization light splitting film having a light receiving side and a light transmitting side, the polarization light splitting film including an optical rotation selecting layer at the light receiving side for reflecting one of right and left circularly polarized components of a light beam that is incident thereon from the light receiving side and for transmitting the other one of the right and left circular polarization components of the light beam; and a quarter-wave layer laminated over the optical rotation selection layer at the light transmitting side.

In another aspect, the present invention provides a backlight system including a polarization light splitting film having a light receiving side and a light transmitting side, the polarization light splitting film including an optical rotation selection layer at the light receiving side for reflecting one of right and left circularly polarized components of a light beam that is incident thereon from the light receiving side and for transmitting the other one of the right and left circular polarization components of the light beam, and a quarter-wave layer laminated over the optical rotation selection layer at the light transmitting side; a light source for emitting a light beam; and a light guide disposed at the light receiving side of the polarization light splitting film for guiding the light beam emitted from the light source towards the polarization light splitting film as the incident light.

In a further aspect the present invention provides a liquid crystal display device including a backlight system and liquid crystal cell receiving the light transmitted from the backlight system to display images. The backlight system includes a polarization light splitting film having a light receiving side and a light transmitting side, the polarization light splitting film including an optical rotation selection layer at the light receiving side for reflecting one of right and left circularly polarized components of a light beam that is incident thereon from the light receiving side and for transmitting the other one of the right and left circular polarization components of the light beam, and the polarization light splitting film further including a quarter-wave layer laminated over the optical rotation selection layer at the light transmitting side; a light source for emitting a light beam; and a light guide disposed at the light receiving side of the polarization light splitting film for guiding the light beam emitted from the light source towards the polarization light splitting film as the incident light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
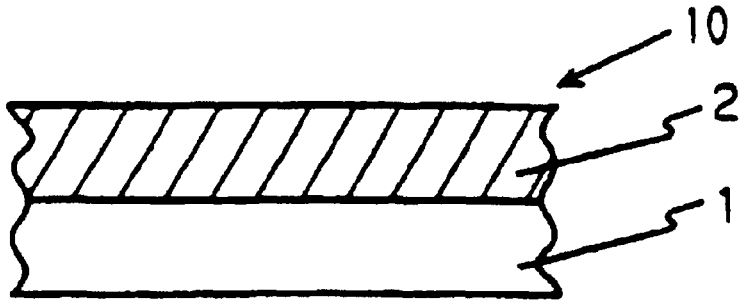
FIG. 1 is a cross-sectional view of a polarization light splitting film according to a preferred embodiment of the present invention.

FIGS. 1–4, 6 and 8 show cross-sectional views of various preferred embodiments of the polarization light splitting film according to the present invention. In FIG. 1, a polarization light splitting film 10 of the present invention includes a quarter-wave layer 2 ($\lambda/4$ phase differentiation layer) formed on an optical rotation selection layer 1. When an unpolarized light beam is incident on the optical rotation selection layer 1 from below, one of the right and left circularly polarized components of the incident light beam is reflected and the other component is transmitted through the optical rotation selection layer 1. The circularly polarized light transmitted through optical rotation selection layer 1 becomes a linearly polarized light beam through the quarter-wave layer 2 and is emitted from the polarization light splitting film 10.

As the optical rotation selection layer 1, any kind of material and/or structure may be used as long as the material and the structure has the desired selectivity on circular polarization. For example, a liquid crystal, in particular, cholesteric liquid crystal, may be used as the material to form the optical rotation selection layer 1.

Cholesteric liquid crystal exhibits the above-mentioned optical rotation selectivity due to its helical molecular structure. Light incident at an angle parallel to the helical axis of the planer structure of the cholesteric liquid crystal is split into two circularly polarized light waves with different rotation directions (right and left: clockwise and counter-clockwise). One of the two circularly polarized components is transmitted and the other component is scattered and reflected. This phenomena is known as circular dichroism. When the orientation of the optical rotation of the circularly polarized light matches the incident light, the circularly polarized light that has the same orientation as the optical rotation of the helical axis of the cholesteric liquid crystal is selectively reflected. The maximum reflection of the opti cally rotated beam occurs at the wavelength $\lambda_0$ in accordance with the following Equation (1).

$$\lambda_0 = n_{AV} \cdot p \quad (1)$$

Here, p is the helical pitch, and $n_{AV}$ is an average refractive index in a plane perpendicular to the helical axis. The wavelength bandwidth $\Delta\lambda$ of the reflected light is given in the following Equation (2).

$$\Delta\lambda = \Delta n \cdot p \quad (2)$$

where $\Delta n = n\| - n\perp$, $n\|$ is the maximum refractive index in a plane perpendicular to the helical axis, and $n\perp$ is the maximum refractive index in a plane parallel to the helical axis. Also, it is known that the wavelength $\lambda\phi$ of the selectively scattered light, originating from the light obliquely incident on the liquid crystal layer with respect to the helical axis of the planar structure, is shifted from $\lambda_0$ toward the shorter wavelength.

Using the above-mentioned characteristics, it is possible to use only light having a certain wavelength. Alternatively, the helical pitch p and the refractive index difference $\Delta n$ of the cholesteric liquid crystal may be adjusted such that the wavelength bandwidth $\Delta\lambda$ of the reflected light covers the entire range of visible light, making it possible to use white light.

As such a cholesteric liquid crystal, it is desirable to use chiral nematic liquid crystal compounds in which an optically active substance, such as a 2-methylbutyl group, 2-methylbutoxy group, or 4-methylhexyl group, is attached to the end group of a nematic liquid crystal compound, such as a schiff base, azo-system, ester-system, or biphenyl-system.

Also, cholesteric liquid crystal polymers are among the preferable materials for the cholesteric liquid crystal of the present invention. This is because the cholesteric liquid crystal polymer is in its solid phase at a room temperature, and its chiral characteristics are easily maintained. In general, to form a liquid crystal polymer, a mesogen group of a liquid crystal phase is introduced in the main chain and/or the side chain. The cholesteric liquid crystal polymer can also be obtained by introducing a cholesteril group in the side chain, for example. In this case, the cholesteril group can be introduced to the side chain of a main chain polymer of polysiloxane or a vinyl polymer, such as an ethyiene-vinyl acetate copolymer, through a spacer (molecular) providing an appropriate distance. Alteratively, a vinyl monomer having a cholesteril group may be polymerized to produce the cholesteric liquid crystal polymer.

The optical rotation selection layer of the present invention may have a single layered structure of a cholesteric liquid crystal layer or a multi-layer structure in which an optical rotation selection layer is coated on a base member (substrate). In the polarization light splitting film 10 shown in FIG. 2, optical rotation selection material, made of cholesteric liquid crystal, is coated on a base member 3 (substrate) to form a cholesteric liquid crystal layer 4 thereon. The optical rotation selection layer 1 corresponds to the multi-layered structure of base member 3 and cholesteric liquid crystal layer 4. In addition, a quarter-wave layer 2 is formed on the cholesteric liquid crystal layer 4. The substrate side is used as the light receiving surface, and the quarter-wave layer side is used as the light transmitting surface. In an alternative construction, the substrate 3 may be disposed between the quarter-wave layer 2 and the cholesteric liquid crystal layer 4. The arrangement of FIG. 2 has a certain advantage in that the substrate 3 can play the role of a light diffusion layer, prism layer, and/or lens layer, as will be described below. On the other hand, if the substrate is placed between the quarter-wave layer 2 and the cholesteric liquid crystal layer 4, the substrate 3 preferably has little or no optical anisotropy to ensure that light originating from the optical rotation selection layer 4 is conducted towards quarter-wave layer 3 without any undesirable optical modifications.

These multi-layer structures are useful when the optical rotation selection layer is too thin to be handled with ease or when there is difficulty in laminating the optical rotation selection layer together with the quarter-wave layer. In addition, with the multi-layer of the cholesteric liquid crystal layer and the substrate of FIG. 2, the surface of the substrate 3 can be adapted to perform molecular orientation control, i.e., alignment of the orientation of the cholesteric liquid crystal molecules. Typically, the helical axis is aligned normal to the emitting surface of the polarization light splitting film.

In the case of the single layered structure of FIG. 1, the molecular orientation control can be performed by forming the cholesteric liquid crystal layer on a separate substrate that will not become a constituent element of the polarization light splitting film. The molecular orientation is controlled on the separate substrate, and then the resultant cholesteric liquid crystal layer is peeled off from the substrate. Typically, the above-mentioned orientation control is performed by applying cholesteric liquid crystal material on the rubbed surface of a resin film formed on a substrate (either as part of the light splitting film or separate).

A resin film can be used as the substrate 3. The desirable properties of such a resin film include superior transparency, dimensional stability, and coating ability. In particular, films made from polyethyleneterephtalate, polyethylenenaphtalate, polycarbonate, polyethersulfone, and/or acrylic resin are preferable.

The quarter-wave layer 2 may be formed using various methods: laminating multiple layers having different refractive indices, providing a specific orientation in liquid crystal, or orienting molecules by stretching in a predetermined direction a resin film made of, for example, polyesters such as polyethyleneterephtalate, polyethersulfone, polycarbonate, polysulfone, polyetheretherketone, or polyetherketone. Typically, the thickness of the quarter-wave layer 2 is set to approximately 8 to 100 μm.

As shown in FIGS. 3, 4, 6, and 8, the polarization light splitting film of the present invention may include additional functional layers laminated on the light receiving surface or light emitting surface.

Figure 3:
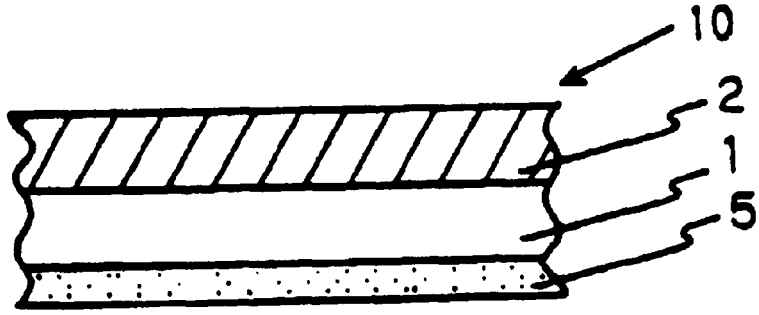
FIG. 3 is a cross-sectional view of a polarization light splitting film having a diffusion layer according to another preferred embodiment of the present invention.

Polarization light splitting film 10 shown in FIG. 3 includes a diffusion layer 5 laminated on the light receiving side. When the polarization light splitting film 10 is used in a backlight system for an LCD device, the diffusion layer 5 serves to blur the image of the light source and thus improve the visibility of the display device. In addition, with the diffusion layer 5, reflected light can be re-used in the polarization light splitting film itself. In other words, as described above, when unpolarized light is incident on the optical rotation selection layer, one of the right and left circularly polarized components is reflected and the other component is transmitted through the optical rotation selection layer. The reflected circularly polarized wave is scattered in the diffusion layer and changed into unpolarized light, and the unpolarized light returns to the optical rotation selection layer. By repeating these steps, a highly polarized beam can efficiently be obtained.

The diffusion layer 5 may be formed by dispersing diffusive agents in a light transmitting resin, utilizing the optical scattering effect due to the difference in refractive index between the diffusion agent and the light transmitting resin, or by forming an uneven surface on a light transmitting resin. Examples of the diffusion agent are beads, fillers and hollow beads with the main component being an acrylic resin, polystyrene, polyethylene, ureaformaldehyde resin, urethane resin, organic silicon resin, calcium carbonate, titanium oxide, or silica. It is desirable that the average particle diameter of the diffusion agent be 1 to 50 μm to facilitate handling. Also, two or more types of agent, with different particle diameters, may be used. Examples of the light transmitting resin are a polyester system resin, acrylic system resin, polystyrene system resin, polyvinylchloride system resin, polyvinylidenechloride system resin, polyethylene system resin, polypropylene system resin, polyurethane system resin, polyamide system resin, polyvinylactate system resin, polyvinylalcohol system resin, epoxy system resin, cellulose system resin, silicon system resin, polymimide system resin, polysulfone system resin, and polyarylate system resin.

Figure 4:
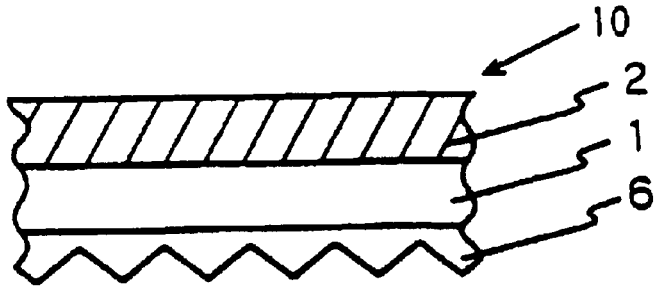
FIG. 4 is a cross-sectional view of a polarization light splitting film having a prism layer according to another preferred embodiment of the present invention.
Figure 5A:
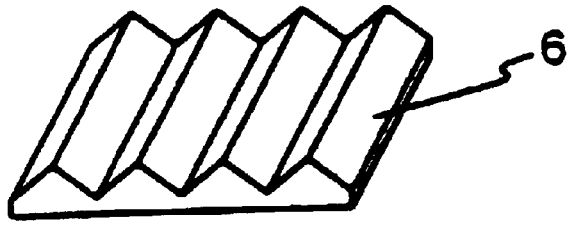
FIGS. 5A and 5B are perspective views of various examples of the prism layer for use in the polarization light splitting film of FIG. 4.
Figure 5B:
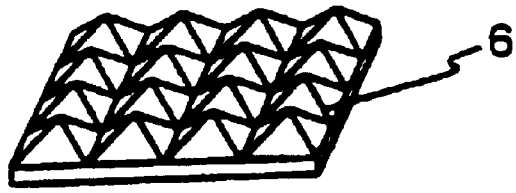

Polarization light splitting film 10 in FIG. 4 has a prism layer 6 laminated on the light receiving side. The prism layer 6 is made of a plurality of prism units. In order for the prism layer 6 to deflect the incident light and change the traveling direction, each of the prism units desirably is a triangular column with a triangular cross-section like prism layer 6 shown in FIG. 5A or a pyramid-shape prism layer 6 as shown in FIG. 5B. The pryamid is a quadrangular pyramid.

Figure 6:
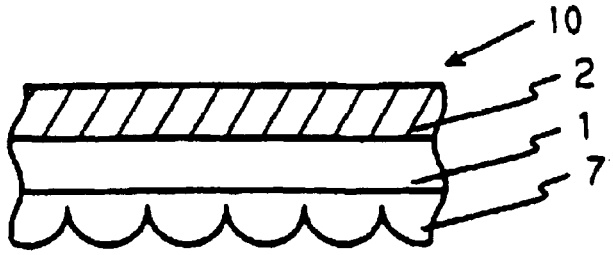
FIG. 6 is a cross-sectional view of a polarization light splitting film having a lens layer according to another preferred embodiment of the present invention.
Figure 7A:
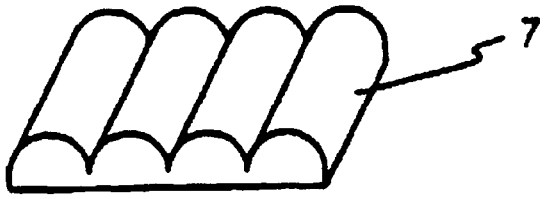
FIGS. 7A, 7B, and 7C are perspective views of various examples of the prism layer for use in the polarization light splitting film of FIG. 6.
Figure 7B:
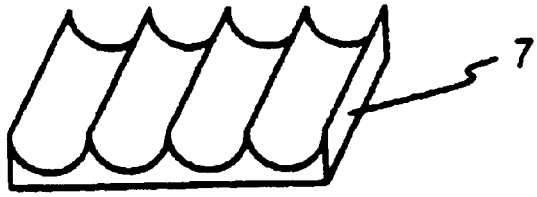
Figure 7C:
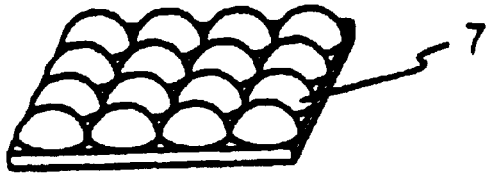

Polarization light splitting film 10 shown in FIG. 6 has a lens layer 7 laminated on the light receiving side. The lens layer 7 is made of a plurality of lens units. In order for the lens layer to deflect the incident light and converge or diffuse the light, each of the lens units desirably is a semi-circular column shape lens layer 7 as shown in FIG. 7A, an inverse semicircular column shape lens layer 7 as shown in FIG. 7B, or a dome-shape lens layer 7 as shown in FIG. 7C.

The above-mentioned prism layer and lens layer can be formed by various methods: a thermal press method in which the uneven shape is molded on the specimen's surface by pressing a high-temperature molding form on a resin film in a thermoplastic state; a simultaneous extrusion-embossing method in which, when a resin is formed into a film shape by melting-extrusion at a high temperature, an uneven shape is concurrently formed on the surface by an embossing roll; or a 2P (Photo Polymer) method in which an ionizing radiation-setting resin is molded on a resin film by a mold form and then cured. The resultant film with the uneven surface is adhered to the optical rotation selection layer with an adhesive or is used as the substrate.

The resin film that can be used in the above-mentioned thermal press method and simultaneous extrusion-embossing method includes, for example, acrylic resins, polycarbonate resins, polyester resins such as polyethyleneterephtalate, polystyrene resin, and vinylchloride resin.

Examples of the ionizing radiation-setting resin that can be used in the above-mentioned 2P method include, for example, known ultraviolet-setting resins and electron beam setting resins, represented by compounds made from a prepolymer and/or a monomer that has in its molecules a functional polymerization group, such as a (meta)-acryloyl group (here and in the following description, "(meta)" is used to represent both with and without "meta", i.e., acryloyl group and meta-acryloyl group), a (meta)acryloyloxy group, epoxy group, or a mercapto group.

For example, the main component of such a compound is a prepolymer, such as urethane(meta)acrylate, epoxy(meta) acryalte, or silicon(meta)acrylate, or a multifunctional monomer, such as trimethylolpropanetri(meta)acrylate, or dipentaerythritolhexa(meta)acrylate.

In order for the prism layer or lens layer to have a high refractive index, it is preferable to use a high bridged type compound having the above-mentioned multifunctional monomer as the principle component. Typically, a non-solvent type ionizing radiation setting resin is used. However, depending on requirements, it is acceptable to use the one that is diluted in a solvent.

Examples of the above-mentioned resin film that can be used together with the ionizing radiation setting resin include a polyester resin such as polyethyleneterephtalate, an acrylic resin such as polymethyl(meta)acrylate, and films made of polycarbonate, polyarylate, polyimide, polypropylene, or fluororesin.

To cure the ionizing radiation setting resin with ultraviolet radiation, a photopolymerization initiator, such as an acetophenone class or benzophenone class, and/or a photosensitization agent, such as n-butylamine, triethylamine or tri-n-butylphosphine, are appropriately added in the resin.

Curing of the ionizing radiation setting resin is normally conducted by irradiating the resin with an electron beam or ultraviolet radiation. When the electron beam is used for the curing, the electron beam needs to have an energy level ranging from 50 to 1000 ke V, or more preferably from 100 to 300 ke V. Such an electron beam can be obtained from an electron beam accelerator, such as Cockroft-Walton's type, Van De Graaf type, resonance transformation type, insulated core transformation type, linear type, dynamitron type, or high-frequency type. For ultraviolet-setting, ultraviolet rays from a light source, such as a very high-pressure mercury-arc lamp, a high-pressure mercury-arc lamp, a low-pressure mercury-arc lamp, a carbon arc, a xenon arc, or a metal halide lamp, can be used.

Figure 8A:
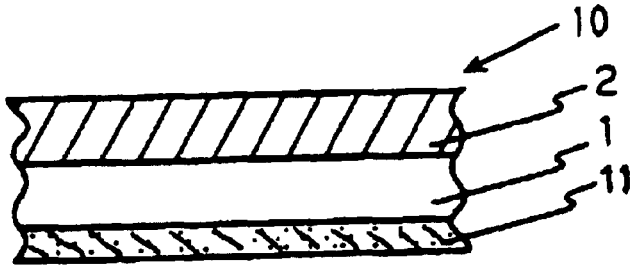
FIG. 8A is a cross-sectional view of a polarization light splitting film having an anti-reflection layer according to another preferred embodiment of the present invention.

Referring to FIG. 8A, it is possible to laminate an anti-reflection layer 11 on the optical rotation selection layer, diffusion layer, prism layer, or the lens layer at the respective light receiving side. With the anti-reflection layer, the loss of light due to reflection on the incident surface can be reduced.

A standard anti-reflection layer may be used for this purpose. Alternatively, a multi-layer film formed by alternatively laminating low refractive index layers and high refractive index layers with the low refractive index layer on the front side may be used as the anti-reflection layer. Such low refractive index layers may be formed by vacuum deposition, sputtering, or plasma chemical vapor deposition (CVD) of a low refractive index material, or by coating a coating solution having a powder-state low refractive index material in a resin binder. The high refractive index layers may be formed by vacuum deposition, sputtering, or plasma CVD of a high refractive index material, or by coating a coating solution having a powder-state high refractive index material in a resin binder. In view of the anti-reflection effect, it is desirable that the thickness of the low refractive index layer be about 0.1 μm and that the thickness of the high refractive index layer also be about 0.1 μm.

If the surface on which the anti-reflection layer is formed is an uneven surface, such as a prism surface or lens surface, the anti-reflection layer may be formed by a coating method, such as dipping method or spraying method, or by a thin-film forming method, such as vacuum vapor deposition, sputtering, or plasma CVD.

For the low refractive index material, inorganic compounds, such as LiF, $MgF_2$, $3NaF.AlF_3$, $AlF_3$, $Na_3.AlF_6$ or SiOx ($1.50 \leqq x \leqq 2.00$) (refractive index of 1.35 to 1.48), may be used. When included in the resin binder, ultra-micro particles with a diameter of 5 nm to 50 nm may be used.

In addition, a low refractive index organic compound, such as a low refractive index thermoplastic resin (polymer), may be added to the resin binder in addition to the above-mentioned ultra-micro particles to adjust the refractive index of the low refractive index layer. Examples of such a low refractive index thermoplastic resin are fluororesins obtained by homopolymerization of fluorine inclusive monomers, such as $CF_2{=}CF_2$, $CH_2{=}CH_2$, and $CF_2{=}CHF$, or by copolymerization, block polymerization or graft polymerization of two or more kinds of monomers. For example, PTFE (poly4ethylene fluoride), PVDF (polyvinylidene fluoride), and PVF (polyvinyl fluoride) are desirable because their refractive index is low: 1.45 or less. As the low refractive index material described above, it is also possible to make the resin binder itself have a low refractive index by including fluoride in the molecules of the compound that constitutes the resin binder.

For the high refractive index material, inorganic compounds, such as ZnO, $TiO_2$, $CeO_2$, $Sb_2O_5$, $SnO_2$, ITO (Indium Tin Oxide), $Y_2O_3$, $La_2O_{3l}$ , $_{ZrO2}$, or $Al_2O_3$, can be used. When the material is to be included in a resin binder, the corresponding ultra-micro particles are used.

In addition, when a resin binder is used for the high refractive index layer, the resin binder itself can have a high refractive index by including the halogen group (except fluoride), sulfur, nitrogen, or phosphorus in the molecules of the compound that constitutes the resin binder.

An ionizing radiation setting resin can be used as a resin binder for the formation of the low refractive index layer and the high refractive index layer. Known ionizing radiation setting resins includes ultraviolet setting resins or electron beam setting resins, represented by, for example, compounds made from prepolymers and/or monomers that have a polymerization function group, such as a (meta)acryloyl group, (meta)acryloyloxy group, epoxy group, or mercapto group, in the constituent molecules. Examples of compounds that can be used are made by adding an appropriate reactive dilution to a prepolymer, such a urethane(meta) acrylate, epoxy(meta)acrylate, or silicon(meta)acrylate. The reactive dilution may be a monofunctional monomer, such as ethyl(meta)acrylate, ethylhexyl(meat)acrylate, styrene, methystyrene, or N-vinylpyrrolidene, or a multifunctional monomer, such as trimethylolpropanetri(meta)acrylate, hexanediol(meta)acrylate, tripropyleneglycoldi(meta) acrylate, diethyleneglycoldi(meta)acrylate, pentaerythritoltri(meta)acrylate, dipentaerythritolhexa (meta)acrylate, 1,6-hexanedioldi(meta)acrylate, and neopentylglycoldi(meta)acrylate.

For producing a low refractive index, it is desirable to have less multifunctional monomers, which are desirable to use if the film lacks a sufficient elasticity. When a fluoride inclusive monomer, such as trifluoroethylacrylate (refractive index of 1.32), is used, the resin binder itself can have a low reflective index. Trifluoroethylacrylate is a monofunctional monomer, and when its homopolymer has a weak film strength, a multifunctional monomer, such as dipentaerythritolhexaacrylate, may be added. However, when the multifunctional monomer is added, the refractive index increases. Therefore, the concentration of such a multinational monomer is desirably within the range of 1 to 50 parts by weight for every 100 parts by weight of the monofunctional monomer, or more preferably, within the range of 5 to 20 parts by weight.

The above-mentioned ionizing radiation setting resin may be used without a solvent or diluted in a solvent, depending on the need.

An example of the ionizing radiation setting resin is a mixture of polyester acrylate and polyurethane acrylate. The resultant film has a strength, flexibility, and impact durability. The mixing ratio preferably is 30 or less parts by weight of polyurethaneacrylate for every 100 parts by weight of polyesteracrylate to produce sufficient hardness.

In addition, when a setting resin is cured with ultraviolet rays, in a fashion similar to the ionizing radiation setting resin used in the lens layer and prism layer described above, a photopolymerization initiator and photosensitization agent can be appropriately added to the resin. The curing process can be conducted by irradiating the resin with electron beams or ultraviolet rays in a similar manner.

Figure 8B:
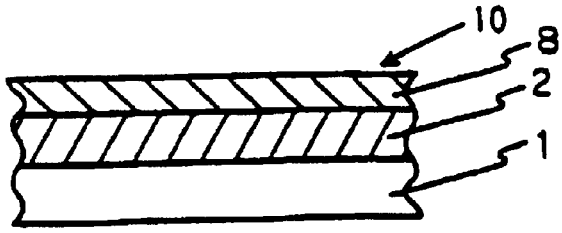
FIG. 8B is a cross-sectional view of a polarization light splitting film having a polarizing layer according to another preferred embodiment of the present invention.

FIG. 8B shows a polarization light splitting film 10 according to another preferred embodiment of the present invention, in which polarizing layer 8 is laminated on the emitting side of the polarization light splitting film. In FIG. 8B, polarizing layer 8 is laminated on quarter-wave layer 2. The light emitted from the quarter-wave layer is converted from a circularly polarized beam to a linearly polarized beam by the quarter-wave layer 2. By incorporating polarizing layer 8, even greater linearity in the polarization can be obtained; i.e., a linearly polarized beam having strong linear polarization. A polarizing film may be used as the polarization layer 8.

Known resin based films can be used as such a polarizing film. For example, it is possible to form the film using a method in which iodine and/or a dichroistic dye is adsorbed and oriented on a hydrophilic film, such as a polyvinylalcohol system film or a partially formal polyvinylalohol film, an ethylene-vinylacetate copolymer system saponificated film, and a cellulose system film, or using a method of forming polyene by performing a dehydration process on a polyvinylalcohol system film.

By adding the polarizing layer 8 to the polarization light splitting film, as described above, a polarizer plate on the light incident side of a liquid crystal cell, which is normally required to produce a linearly polarized light beam, can be omitted. In this case, it is of course necessary to match the polarization axis of polarizing layer 8 with the polarization axis of the linearly polarized light emitted from the quarter-wave layer 2.

If a polarization light splitting film does not include a polarizing layer, as in the previous embodiments, the polarization axis of the quarter-wave layer (the polarization axis of linearly polarized light emitted from that layer) should be matched with the polarization axis of a liquid crystal cell that is to be coupled to the polarization light splitting film.

Figure 2:
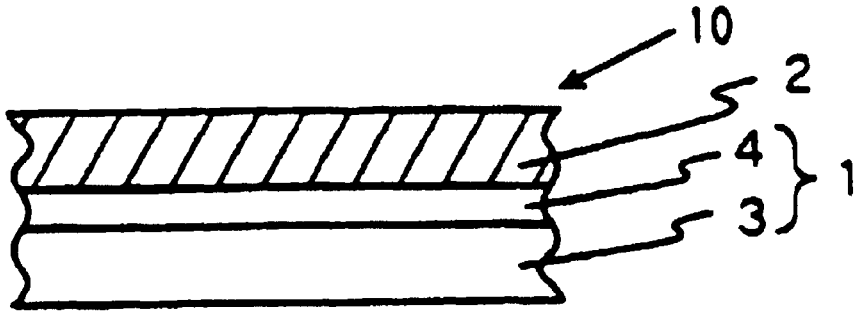
FIG. 2 is a cross-sectional view of a polarization light splitting film according to another preferred embodiment of the present invention.

The above-mentioned layers may be laminated on a base member having a sufficient strength such as substrate 3 in FIG. 2. Also, it is possible to adhere the layers together using a cement layer or an adhesive layer in between.

For the cement used for the cement layer, it is desirable to use urethane system cements, for example, reactive-setting type urethane system cements, such as humidity-setting types (1-liquid type) or thermosetting types (2-liquid type). The humidity-setting types are used in combination with an oligomer and/or a prepolymer of a polyisocyanate compound. The thermosetting-types are used in combination with an oligomer and/or a prepolymer of a polyol compound and with a monomer, oligomer, and/or prepolymer of a polyisocynate compound. For these reactive-setting-type urethane system cements, when the aging process is conducted after the lamination, it is desirable to conduct it in the temperature range from a room temperature to 80 degrees centigrade. For the adhesive used for the adhesive layer, known adhesive compounds of acrylic resin-type can be used.

On the polarization light splitting film with the laminated structure, a hard coat layer, an adhesive layer, or a cement layer can be formed depending on their needs. Here, the hard coat layer represents a layer having a hardness of H or higher in the pencil hardness test based on JIS (Japanese Industrial Standards) K5400. The hard coat layer can be formed from either inorganic materials or organic materials. An example of an inorganic material that can be used is a complex oxide film formed by a sol-gel method. Organic materials that can be used include a transparent resin film of a thermoplastic resin, and more preferably, a reactive-setting resin, such as a thermosetting resin or ionizing radiation setting resin. The ionizing radiation setting resin is more preferable. For the thermosetting resin, a phenol resin, urea resin, diallylphtalate resin, melamine resin, guanamine resin, unsaturated polyester resin, polyurethane resin, epoxy resin, aminoalkyd resin, melamine-urea copolycondensated resin, silicon resin, or polysiloxane resin can be used. Depending on the requirements of these resins, the hard coat layer is coated with a coating solution that includes a bridging agent or polymerization initiator as a setting agent, a polymerization accelerator, a solvent, and a viscosity adjustment agent.

For the ionizing radiation setting resin, the resins used for the prism layer, lens layer, low refractive index layer, and high refractive index layer described above can be used. To add flexibility to the hard coat layer of the ionizing radiation setting resin, it is acceptable to include 1 to 100 parts by weight of the thermoplastic resin for every 100 parts by weight of the ionizing radiation setting resin. For the thermoplastic resin, if the ionizing radiation setting resin composition is made of polyester acrylate and polyurethane acrylate, polymethylmethacryl acrylate and polybutylmethacryl acrylate are desirable in terms of their transparency, low haze value, high light transmitability, and compatibility. When the resin is cured with ultraviolet radiation, a photopolymerization initiator and a photosensitization agent are appropriately added in the resin in a similar manner to the ionizing radiation setting resin used in the lens layer and prism layer. Similarly, the curing is conducted by irradiation with electron beams or ultraviolet rays. In addition, it is preferable that the thickness of the hard coat layer be about 0.5 μm, or more preferably, about 3 μm or more to maintain necessary hardness.

As the adhesive layer and the cement layer, known materials, such as adhesives with an acrylic resin and cement layers with a urethane system adhesive, can be used, for example.

Figure 9:
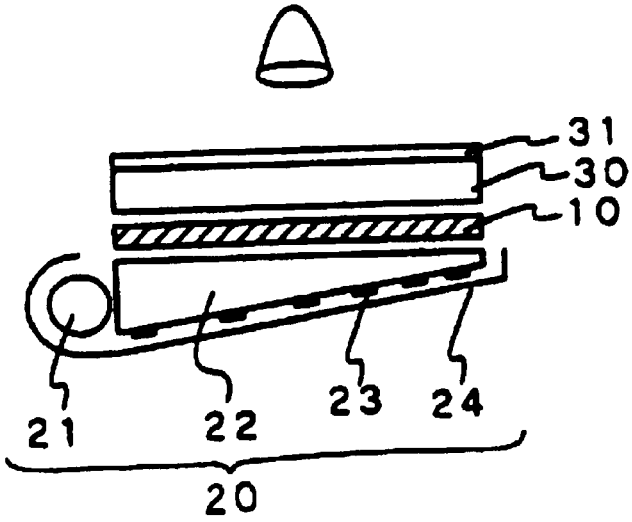
FIG. 9 is a cross-sectional view of a liquid crystal display device having a backlight system according to another preferred embodiment of the present invention.
Figure 10:
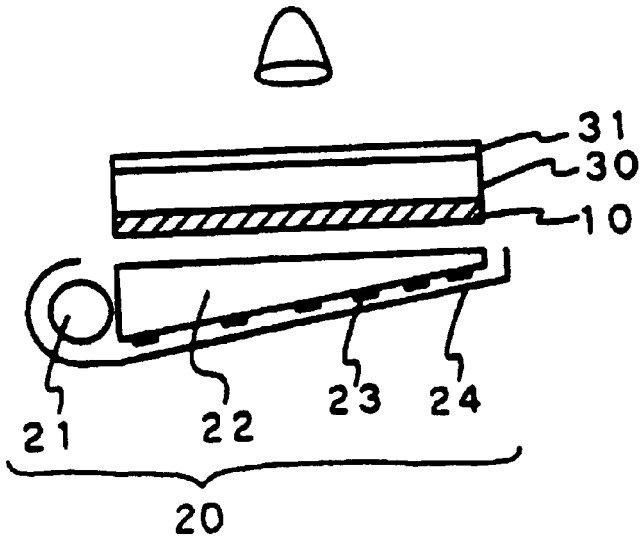
FIG. 10 is a cross-sectional view of a liquid crystal display device having a backlight system according to still another preferred embodiment of the present invention.
Figure 11:
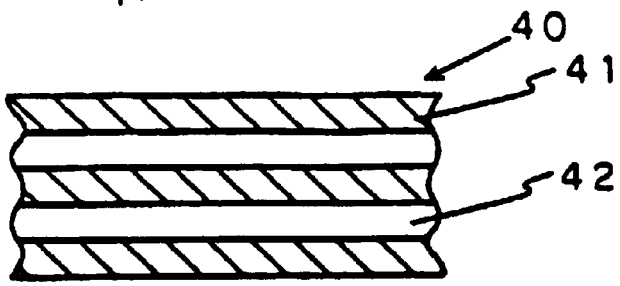
FIG. 11 PRIOR ART
FIG. 11 is a cross-sectional view of a conventional light splitting film.
Figure 12:
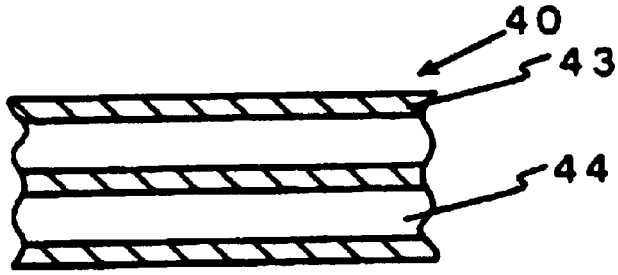
FIG. 12 PRIOR ART
FIG. 12 is a cross-sectional view of another conventional light splitting film.
Figure 13:
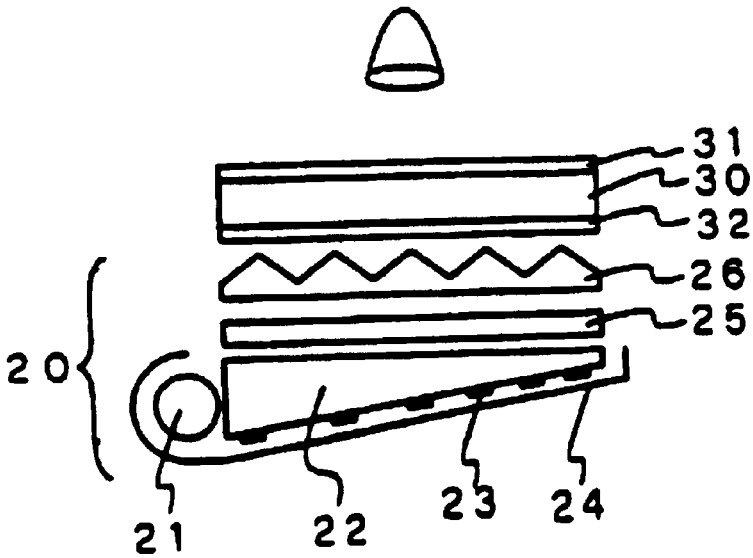
FIG. 13 PRIOR ART
FIG. 13 is a cross-sectional view of a conventional liquid crystal display device having a backlight system.

Next, backlight and liquid crystal devices according to other preferred embodiments of the present invention will be described with reference to FIGS. 9 and 10. FIG. 9 shows a cross-sectional view of the backlight and the liquid crystal device using the polarization light splitting film according to another preferred embodiment of the present invention. FIG. 10 shows a cross-sectional view of a backlight and liquid crystal device according to still another preferred embodiment of the present invention.

In FIG. 9, backlight system 20 includes light source 21, light guide 22, light diffusion elements 23, reflection sheet 24, and polarization light splitting film 10. The liquid crystal device includes the backlight system 20, light crystal cell 30, and polarizing plate 31 affixed to the front side of the liquid crystal cell 30.

In the backlight and liquid crystal device of FIG. 10, the polarization light splitting film 10 is affixed to liquid crystal cell 30 by an adhesive or cement. In FIG. 10, backlight system 20 includes light source 21, light guide 22, light diffusion elements 23, reflection sheet 24, and polarization light splitting film 10 in contact with liquid crystal cell 30. The liquid crystal device includes the backlight system 20, liquid crystal cell 30, and polarizing plate 31 affixed to the front surface of the liquid crystal cell 30.

In FIGS. 9 and 10, an additional polarizing plate may be formed on the bottom surface (light incident surface) of the liquid crystal cell 30. Also, if desired, a diffusion sheet or prism sheet may be inserted between light guide 22 and polarization light splitting film 10. Here, as the light source 21, a linear light source, for example, a cold cathode tube, may be used.

The material of light guide 22 needs to have the ability to transmit light efficiently but is not limited to a specific class of material. Examples are an acrylic resin, such as PMMA (polymethylmeta acrylate), a polycarbonate resin, and glass. The light guide 22 preferably has a plate-shape or a wedge-shape with the thickness decreasing in a direction away from the light source. Light emitted from the light source 21 travels in the light guide 22 by repeating total internal reflections. The light is also diffused (scattered) by the light diffusion elements 23, and is emitted from the emitting face of the light guide 22.

To form the light diffusion elements 23 in the light guide, the following methods can be used: (1) forming light diffusion elements by dispensing such an agent as silica in a resin in a dot pattern on the light emitting face or on the other (bottom) face of the light guide 23 by a printing or like method (FIGS. 9 and 10 shows the case of having the diffusion elements on the bottom face of light guide 22); (2) roughening the emitting face of the light guide 23; (3) roughening the bottom face of light guide 23; or (4) introducing a light diffusion (scattering) agent, such as a resin, having a different refractive index from the light guide into the light conducting material of the light guide.

For reflective sheet 24, a white plastic sheet or a plastic sheet having aluminum vapor-deposited thereon, can be used.

In the structure shown in FIGS. 9 and 10, a diffusion film, prism sheet and/or polarizing plate can be placed between the light guide and the polarization light splitting film in a similar manner to conventional backlight systems which do not have a polarization light splitting film. Such a diffusion film is desirable when a polarization light splitting film does not include a diffusion layer on the incident surface side. Also, a prism sheet or polarizing plate is desirable when the polarization light splitting film does not include the corresponding layer (prism layer or polarizing layer).

As for the arrangement of the diffusion film and prism sheet, instead of placing the diffusion film and prism sheet in that order from the emitting surface side of the light guide, the order of the arrangement may be the prism sheet and then the diffusion film. Multiple layers of diffusion film and prism sheets may also be used. The arrangement of the diffusion films and the prism sheets is not limited by use of the polarization light splitting film of the present invention.

The diffusion film may be formed by molding a polymer film using the embossing method or the like for forming a rough surface or by distributing beads or fillers of an organic or inorganic material in the resin.

The prism sheets function properly, as long as the material has efficient light transmissibility. Examples of such a material include polycarbonate (PC), polyester resins such as polyethylene terephtalate (PET), acrylic resins such as polymethyl metacrylate (PMMA), and glass. In particular, prism sheets created by forming a prism-shape layer on a base film made of PET or PC using an ultraviolet-setting resin are preferable since micro prism-shape structure can be accurately formed and this forming method is suitable for mass production. In this case, the refractive index of the prism-shape layer made of the ultraviolet-setting resin is preferably about 1.4 or larger, or more preferably, about 1.5 or larger. To form the prism shape layer with the ultraviolet-setting resin on the base film, it is desirable to utilize a method disclosed in Laid-Open Japanese Patent Application No. 05-169015. In this method, the ultraviolet-setting resin is coated on an intaglio roll that has recessed patterns corresponding to the prism shape to be manufactured, and a base film is pressed on the intaglio roll having the resin solution on the printing surface. Then, the intaglio roll is irradiated with ultraviolet radiation to cure the resin. Thereafter, the cured ultraviolet-setting resin is peeled off from the intaglio roll together with the base film. By this method, the prism sheet can be continuously manufactured.

As descried with reference to FIGS. 9 and 10, the liquid crystal device of the present invention is a display device equipped with the polarization light splitting film in which the above-mentioned structure is used as a backlight system for illuminating the liquid crystal cell.

Working examples of the present invention will now be described with reference to the drawings.

FIRST WORKING EXAMPLE

As the optical rotation selection layer, a cholesteric liquid crystal polymer film (having the helical axis of the liquid crystal along a direction of the thickness and showing superior circular dichroism with respect to visible light) with a thickness of 15 μm was formed by photopolymerization with ultraviolet irradiation. A phase-differentiation film made by Sumitomo Chemical Co., Ltd. product name "SUMILITE" with a thickness of 60 μm, was used as the quarter-wave layer. The resultant optical rotation selection layer and quarter-wave layer were adhered to each other with an adhesive compound to form the polarization light splitting film. See FIG. 1 for the structure.

SECOND WORKING EXAMPLE

A cholesteric liquid crystal polymer film with a thickness of 2 μm was formed on a glass base by photopolymerization with ultraviolet irradiation. By grinding the cholesteric liquid crystal polymer film, a filler of the cholesteric liquid crystal polymer, each molecule having a fish-scale-like shape with about 20 μm in average diameter, was obtained. The filler was dispersed into a solvent solution of acrylic resin to yield a coating solution. The coating solution was coated on a polyethyleneterephtalate film base of a thickness of 50 μm to form a cholesteric liquid crystal layer of thickness 20 μm (in dry) thereon. An optical rotation selection layer of this working example corresponds to the film base and the cholesteric liquid crystal layer. The quarter-wave film of the first working example above was adhered on the cholesteric liquid crystal layer in a manner similar to that of the first working example to complete the polarization light splitting film of the present working example. See FIG. 2 for the structure.

THIRD WORKING EXAMPLE

In a third working example of the polarization light splitting film, a diffusion layer with an average thickness of 20 μm (in dry) was additionally formed on the polyethyleneterephtalate film side (light receiving side) surface of the optical rotation selection layer of the second working example above. The diffusion layer was formed by coating a diffusion coat on the surface using a rolling coater. The diffusion coat was prepared mixing acrylic resin beads with the average particle diameter of 10 μm as a diffusion agent with a polyester resin, an isocyanate setting agent, and a solvent. See FIG. 3 for the structure.

FOURTH WORKING EXAMPLE

A polarization light splitting film according to a fourth working example of the present invention has an anti-reflection layer attached to the light receiving surface (polyethyleneterephtalate film surface) of the polarization light splitting film of the second working example above. The anti-reflection layer was manufactured by forming a hard coat layer with a thickness of 5 μm having a high refractive index on the polyethyleneterephtalate film surface of the second working example and then forming a low refractive index layer with a thickness of 0.1 μm on the hard coat layer. To form the hard coat layer, a solution of acrylate having a carboxyl group with ultra-micro particles of $ZrO_2$ was coated on the polyethyleneterephtalate film surface and is cured with electron beam irradiation. The low refractive index layer was formed by depositing $SiO_2$ (refractive index: about 1.46) on the hard coat layer by vapor deposition.

FIFTH TO NINTH WORKING EXAMPLES

Various film bases having uneven surface profiles were manufactured to serve as a prism layer or lens layer for supporting the optical rotation selection layer, as follows.

First, an uneven surface profile was formed on a copper plated surface of a cylindrical block with a plurality of unit elements arranged at a 50 μm pitch and by plating the resultant surface with chrome. The resultant cylindrical block serves as an intaglio roll for forming a film base. Each of the unit elements on the intaglio roll has a predetermined surface profile that is in a reciprocal relationship with the surface profile of each of the unit elements disposed on the film base to be manufactured. Various intaglio rolls were manufactured to form various prism layers and lens layers. Cutting processes with a diamond bit were used for forming the surface profiles of an isosceles triangle with an apex angle of about 90 degrees (corresponding to a fifth working example: see FIG. 5A), a semi-circular column shape (corresponding to a sixth working example: see FIG. 7A), and an inverse semi-circular column shape (corresponding to a seventh working example: see FIG. 7B), before plating chrome on the respective cylindrical blocks. A machine engraving processor is used for forming the quadrangular pyramid shape (corresponding to an eighth working example: see FIG. 5B) and a dome shape (corresponding to a ninth working example: see FIG. 7C) before plating chrome on the respective cylindrical blocks.

Using the thus manufactured rolling intaglios as embossing plates, the respective film bases each serving as a prism layer or a lens layer were created by embossing a polycarbonate film having a thickness of 100 μm by thermal pressing. Using each of the film bases as the substrate 3 for supporting the optical rotation selection layer of the second working example (with the cholesteric liquid crystal layer formed on the surface of the film base opposite to the uneven surface), the corresponding working examples (fifth to ninth) were completed.

TENTH TO FOURTEENTH WORKING EXAMPLES

In these working examples, film bases having uneven surface profiles corresponding to the fifth to ninth working examples above were manufactured by a different method. The tenth to fourteen working examples respectively correspond to the fifth to ninth working examples.

In these working examples, instead of using embossment, an ultraviolet setting resin was used to form the uneven surface profiles of the film bases corresponding to the fifth to ninth working examples. A urethane resin system primer was applied on a polyethyleneterephtalate film with a thickness of 100 μm and was thermally cured to form a primer layer with a thickness of 1 μm on the polyethyleneterephtalate film.

An ultraviolet setting resin solution with an epoxy acrylate system as the primary component was coated on the corresponding rotating intaglio roll. Then, the composite film obtained above was pressed onto the intaglio roll with the ultraviolet setting solution and irradiated with ultraviolet radiation to cure the resin solution. The solidified ultraviolet setting resin is peeled off along with the film from the rotating intaglio roll. A film base that serves as a prism layer or lens layer made of cured ultraviolet setting resin on the primer layer is thereby created. This film base is used as the base for the optical rotation selection layer in the second working example. By forming a cholesteric liquid crystal layer on the surface of the resultant film base opposite to its uneven surface, the polarization light splitting film was completed.

FIFTEENTH WORKING EXAMPLE

A polarizing film with a thickness of 120 μm (made by Sumitomo Chemical Co., Ltd., product name, "SUMILITE") was adhered on the quarter-wave layer of the second working example above (i.e., on the light emitting side). See FIG. 8B for the structure.

Evaluations

The transmissivity of polarized light, haze, and the luminance of the backlight were measured using the following methods. The results are listed in Tables 1 and 2.

Figure 14:
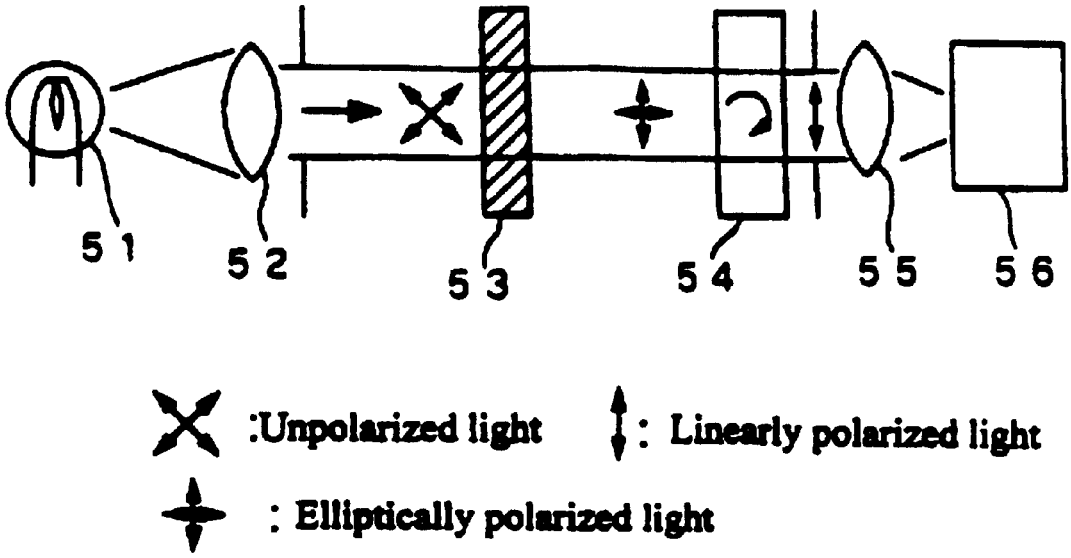
FIG. 14 is a schematic diagram showing the experimental set-up for measuring the degree of linear polarization for each of the working examples of the present invention.

(1) The polarized light transmission factor: the degree of the polarization linearity in the linearly polarized beam obtained by each of the polarization light splitting films of the above working examples first to fifteen are evaluated in terms of the polarized light transmission factor. FIG. 14 shows the device arrangement used for the measurement. An unpolarized light beam from a light source 51 is transformed into a parallel beam through a lens 52. The parallel beam is incident normally on a polarization light splitting film 53 with the optical rotation selection layer side facing towards the light source 51 and with the quarter-wave layer side facing in the opposite direction. To measure the linearly polarized component of the transmitted light, a Glen-Thomson prism 54 is rotated around the optical axis of the parallel beam. Transmitted light is guided towards a photodetector 56 through a lens 55 and the intensity of the transmitted light is measured in two conditions: when the polarization axes of the prism 54 and quarter-wave layer in the polarization light splitting film 53 are perpendicular to each other and when they are parallel to each other. The corresponding orthogonal transmission factor T⊥ (%) and the parallel transmission factor T|| (%) were obtained for each of the above working examples.

(2) Haze: With a direct-reading haze meter made by Toyo Seki Co., Ltd., haze is measured by placing the optical rotation selection layer side of the polarization light splitting film as the light receiving side and the quarter-wave layer side as the light emitting side.

(3) Luminance: The luminance was measured for the liquid crystal devices with the structure shown in FIG. 10. A liquid crystal device with the polarization light splitting film 10 of the fifteenth working example arranged at the light receiving side of liquid crystal cell 30 was compared with a liquid crystal device with a conventional polarization plate. The luminance was measured in a direction normal to the display surface of the liquid crystal device using a luminance meter BM-7 by Topcon Corp.

TABLE 1

Measurement results for the polarized light transmission factor and haze

| Working Example | T⊥ (%) | T\|\| (%) | Haze (%) |
|---|---|---|---|
| 1 | 10 | 75 | 5 |
| 2 | 10 | 80 | 3 |
| 3 | 5 | 65 | 30 |
| 4 | 5 | 82 | 10 |
| 5 | 5 | 80 | 10 |
| 6 | 5 | 80 | 10 |
| 7 | 5 | 80 | 10 |
| 8 | 5 | 80 | 10 |
| 9 | 5 | 80 | 10 |
| 10 | 5 | 83 | 5 |
| 11 | 5 | 83 | 5 |
| 12 | 5 | 83 | 5 |
| 13 | 5 | 83 | 5 |
| 14 | 5 | 83 | 5 |
| 15 | 0.5 | 35 | 3 |

TABLE 2

Measurement results for luminance

| | Luminance in the normal (cd/cm$^2$) |
|---|---|
| Polarization light splitting film (Working Example 15) | 85 |
| Standard polarizing plate | 70 |

As shown in Tables 1 and 2, each embodiment had satisfactory results for the polarization linearity and the haze value. The luminance was improved by approximately 20% (=(85−70)/70×100).

As described above, according to the present invention, the light usage efficiency of the backlight system can be improved with a relatively simple structure. In addition, due to its relatively simple structure, the polarization light splitting film of the present invention has superior mass production capability. Also, it has a planar shape and is suited for designing thin backlight systems and thin liquid crystal display devices.

In addition, by equipping the polarization light splitting film according to the present invention with functional layers, such as a diffusion layer, prism layer, lens layer, and polarizing layer, it becomes possible to assemble a backlight system having a simple structure.

Furthermore, the backlight and liquid crystal device using the polarization light splitting film of the present invention can easily be made thin. Additionally, when a polarization light splitting film includes the functional layers, the system construction is simplified and complicated assembly processes are not necessary.

It will be apparent to those skilled in the art that various modifications and variations can be made in the polarization light splitting film of the present invention without departing from the spirit or scope of the invention. Thus, it is intended that the present invention cover the modifications and variations of this invention provided they come within the scope of the appended claims and their equivalents.

What is claimed is:

[1. A polarization light splitting film having a light receiving side and a light transmitting side, the polarization light splitting film comprising:

an optical rotation selection layer at the light receiving side for reflecting one of right and left circularly polarized components of a light beam that is incident on the light receiving side and for transmitting the other one of the right and left circularly polarized components of the light beam;

a quarter-wave layer laminated over the optical rotation selection layer at the light transmitting side and for emitting linearly polarized light;

a linear polarizing layer laminated over the quarter-wave layer at the light transmitting side and having a polarizing axis which substantially matches a polarization axis of the linearly polarized light emitted from the quarter-wave layer; and a diffusion layer disposed under the optical rotation selection layer at the light receiving side, the diffusion layer including a diffusion agent having an average particle diameter of 1 to 50 μm.]

[2. The polarization light splitting film according to claim 1, further comprising a prism layer at the light receiving side for deflecting the incident light beam.]

[3. The polarization light splitting film according to claim 1, further comprising a lens layer at the light receiving side for one of converging and diverging the incident light beam.]

[4. The polarization light splitting film according to claim 1, wherein the optical rotation selection layer includes a base member and a cholesteric liquid crystal layer laminated on the base member.]

[5. The polarization light splitting film according to claim 4, further comprising a diffusion layer laminated under the optical rotation selection layer at the light receiving side.]

[6. The polarization light splitting film according to claim 5, further comprising a prism layer at the light receiving side for deflecting the incident light beam.]

[7. The polarization light splitting film according to claim 5, further comprising a lens layer at the light receiving side for one of converging and diverging the incident light beam.]

[8. The polarization light splitting film according to claim 4, further comprising a prism layer at the light receiving side for deflecting the incident light beam.]

[9. The polarization light splitting film according to claim 4, further comprising a lens layer at the light receiving side for one of converging and diverging the incident light beam.]

[10. The polarization light splitting film according to claim 1, further comprising a prism layer at the light receiving side for deflecting the incident light beam.]

[11. The polarization light splitting film according to claim 1, further comprising a lens layer at the light receiving side for one of converging and diverging the incident light beam.]

[12. The polarization light splitting film according to claim 1, further comprising an anti-reflection layer at the light receiving side.]

*13. A polarization light splitting film having a light receiving side and a light transmitting side, the polarization light splitting film comprising:*

*an optical rotation selection layer at the light receiving side for reflecting one of right and left circularly polarized components of a light beam that is incident on the light receiving side and for transmitting the other one of the right and left circularly polarized components of the light beam;*

*a quarter-wave layer laminated over the optical rotation selection layer at the light transmitting side and for emitting linearly polarized light;*

*a linear polarizing layer laminated over the quarter-wave layer at the light transmitting side and having a polarization axis which substantially matches a polarization axis of the linearly polarized light emitted from the quarter-wave layer; and*

*a diffusion layer disposed under the optical rotation selection layer at the light receiving side, the diffusion layer including at least two types of diffusion agents, each agent having a different average particle diameter within the range of 1 μm to 50 μm.*

* * * * *